United States Patent
Dorner et al.

(10) Patent No.: US 10,655,722 B2
(45) Date of Patent: May 19, 2020

(54) GEAR

(71) Applicant: Wittenstein SE, Igersheim (DE)

(72) Inventors: Wilhelm Dorner, Kürnach (DE); Michael Lesch, Giebelstadt (DE); Andreas Kümmeth, Uffenheim (DE); Frank Michel, Brakel (DE); Heiko Schreiber, Gnaschwitz (DE); Thomas Wilhelm, Creglingen (DE)

(73) Assignee: Wittenstein SE, Igersheim (DE)

( * ) Notice: Subject to any disclaimer, the term of this patent is extended or adjusted under 35 U.S.C. 154(b) by 715 days.

(21) Appl. No.: 15/349,231

(22) Filed: Nov. 11, 2016

(65) Prior Publication Data

US 2017/0138456 A1    May 18, 2017

(30) Foreign Application Priority Data

Nov. 12, 2015 (DE) .......................... 10 2015 119 582

(51) Int. Cl.

| F16H 25/06 | (2006.01) |
| F16H 55/17 | (2006.01) |
| F16H 49/00 | (2006.01) |
| B23P 15/14 | (2006.01) |
| F16H 55/08 | (2006.01) |

(52) U.S. Cl.
CPC .............. *F16H 55/17* (2013.01); *B23P 15/14* (2013.01); *F16H 25/06* (2013.01); *F16H 49/001* (2013.01); *F16H 2055/0893* (2013.01)

(58) Field of Classification Search
CPC .......... F16H 25/06; F16H 49/001; F16H 55/17
USPC ............................................................ 74/640
See application file for complete search history.

(56) References Cited

U.S. PATENT DOCUMENTS

| 4,798,104 A | * | 1/1989 | Chen ....................... F16H 25/06 |
| | | | 475/159 |
| 6,026,711 A | * | 2/2000 | Tortora ................. F16H 49/001 |
| | | | 384/512 |
| 8,480,528 B2 | * | 7/2013 | Wilhelm ................. F16H 25/06 |
| | | | 475/162 |

FOREIGN PATENT DOCUMENTS

| DE | 341053 | 8/1920 |
| DE | 102007011175 A1 | 9/2008 |
| DE | 102007016189 A1 | 10/2008 |
| DE | 102007020415 A1 | 11/2008 |
| EP | 0201730 A1 | 11/1986 |
| GB | 400282 A | 10/1993 |
| JP | 2007-182952 | * 7/2007 |
| WO | 98/04849 A1 | 2/1998 |

* cited by examiner

*Primary Examiner* — William C Joyce
(74) *Attorney, Agent, or Firm* — Bachman & LaPointe, PC

(57) ABSTRACT

Gear mechanism, in particular coaxial gear mechanism or linear gear mechanism, having a toothing system, a tooth carrier with radially oriented guides, teeth which are received in the guides for engagement with the toothing system, the teeth being mounted in the guides such that they can be displaced radially relative to the tooth carrier in the direction of their longitudinal axis, a cam disk for radially driving the teeth, the tooth carrier comprising a first tooth carrier part and a second tooth carrier part.

13 Claims, 1 Drawing Sheet

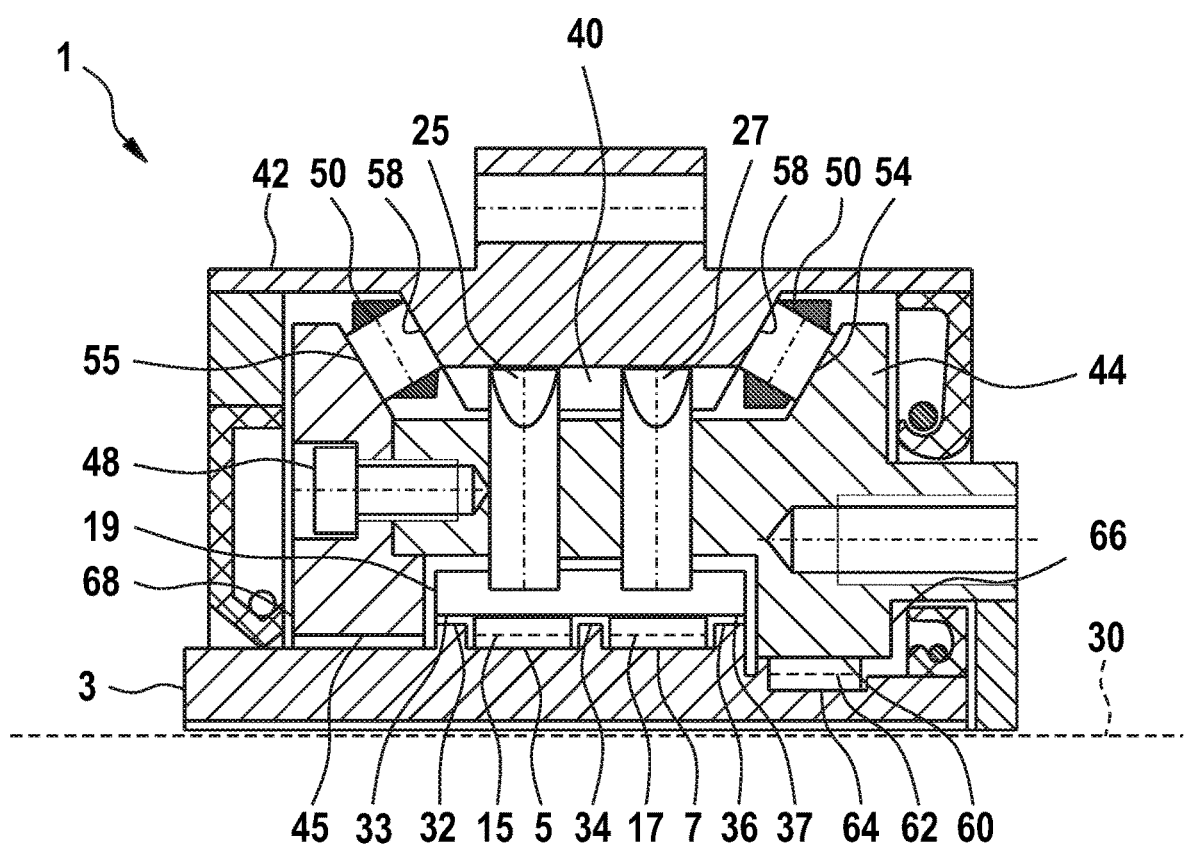

GEAR

FIELD OF THE INVENTION

The invention relates to a gear mechanism and to a method for producing a gear mechanism.

PRIOR ART

Gear mechanisms are known from the prior art which comprise teeth which are mounted radially displaceably in a tooth carrier. In order to drive the teeth, drive elements with a profiling, such as cam disks, are used. The teeth engage into a toothing system, with the result that a relative movement occurs between the tooth carrier with the teeth and the toothing system. Here, the relative movement between the toothing system and the teeth is smaller by at least one order of magnitude than the movement of the drive element with the profiling. In this way, high step-up transmission ratios can be achieved; one example of a gear mechanism of this type is disclosed in DE 10 2007 011 175 A1.

For some applications, however, in known gear mechanisms as described in the cited application document, what is critical in some circumstances is the space requirement of the gear mechanism.

DISCLOSURE OF THE INVENTION

It is an object of the invention to specify gear mechanisms which are improved in comparison with gear mechanisms which are known from the prior art, a gear mechanism for a small available space and a production method for a corresponding gear mechanism being of interest, in particular.

The object is achieved by way of a gear mechanism and a method for producing a gear mechanism as disclosed herein. Advantageous developments and embodiments result from the subclaims and from this description.

One aspect of the invention relates to a gear mechanism, in particular a coaxial gear mechanism or linear gear mechanism, having a toothing system, a tooth carrier with radially oriented guides, teeth which are received in the guides for engagement with the toothing system, the teeth being mounted in the guides such that they can be displaced radially relative to the tooth carrier in the direction of their longitudinal axis, a cam disk for radially driving the teeth, the tooth carrier comprising a first tooth carrier part and a second tooth carrier part.

A further aspect of the invention relates to a production method for a gear mechanism in one of the typical embodiments which are described herein.

Embodiments of the invention relate, in particular, to coaxial gear mechanisms. Gear mechanisms of the invention usually comprise an inner cam disk as a drive element and an internal gear with an internal toothing system or an outer drive element with an inner profiling and an inner gearwheel or an inner rack which provides the toothing system for the case of the outer drive element. Configurations of embodiments relate to linear gear mechanisms for converting a rotation into a linear movement. The expression "cam disk" is typically generally to be understood in such a way that the corresponding component does not necessarily have to be similar to a disk. Rather, the cam disk can also be part of a drive shaft or can have an elongate extent, in particular with a plurality of sections. One or more sections of this type can have a changing radius, with the result that the function of a cam disk is met. Further sections can have other functions and can be, for example, cylindrical or else can be provided with edges, for example for the transmission of torque. Typically, the expression cam disk relates primarily to the function of the said component, namely to provide a circumferential profiling, in order, for example, according to the angular position of the drive shaft and therefore of the cam disk, to drive the teeth in the radial direction or to permit sliding back of the teeth in the guides.

The toothing system is typically a circumferential toothing system. The teeth or the tooth tips of the teeth engage into the toothing system, the teeth typically being mounted such that they can be displaced in a linearly radial manner relative to the tooth carrier. Here, "in a linearly radial manner" usually means that there is a guide in the radial direction which permits merely a movement of the tooth in the radial direction. A tooth can typically be displaced linearly in precisely one direction as a result of the guide; this can be achieved, for example, by virtue of the fact that the tooth has a constant cross section in the displacement direction over a defined section length, the tooth carrier likewise having an opening for the tooth with a constant cross section. The teeth are usually mounted in the tooth carrier such that they can be displaced in each case in precisely one direction, typically in the direction of the longitudinal axis of the tooth. Furthermore, in the case of typical embodiments, the degree of rotational freedom of the teeth relative to the tooth carrier is blocked about the longitudinal axis of the gear mechanism. This can be achieved, for example, by way of a linear guide of the teeth in the radial direction in the tooth carrier. In this way, the teeth rotate with the tooth carrier about the longitudinal axis of the gear mechanism, but not relative to the tooth carrier.

In typical embodiments of the gear mechanisms according to the invention, at least part of the teeth are of flexurally stiff configuration. Here, the expression "flexurally stiff" is typically to be understood in a technical manner, that is to say bending of the teeth on account of the stiffness of the material of the teeth is so small that it is at least substantially insignificant for the kinematics of the gear mechanism. Flexurally stiff teeth comprise, in particular, teeth which are produced from a metal alloy, in particular steel or a titanium alloy, a nickel alloy or other alloys. Furthermore, flexurally stiff teeth can also be provided from plastic, in particular in gear mechanisms, in which at least one of the following parts is also likewise produced from plastic: toothing system on an internal gear or a gearwheel, tooth carrier and drive element. In typical embodiments of the invention, the tooth carrier and the teeth are produced from a metal alloy or, in addition, the toothing system or, furthermore in addition, the drive element are also produced from a metal alloy. Gear mechanisms of this type afford the advantage that they are extremely torsionally stiff and can be highly loaded. Gear mechanisms made from plastic afford the advantage that they have a low weight. The expression "flexurally stiff" means, in particular, a flexural stiffness about a transverse axis of the tooth segment. This means, in particular, that, if the tooth is viewed as a bar from a tooth root to a tooth tip, there is a flexural stiffness which at least substantially rules out bending deformations between the tooth tip and the tooth root. An extremely high load-bearing capability and torsional stiffness of the gear mechanism is achieved by way of the flexural stiffness.

In typical embodiments, a pivoting segment is arranged between the tooth and the cam disk, which pivoting segment is mounted on an anti-friction bearing which in turn lies on the cam disk. Advantageous embodiments comprise a pivoting segment which is arranged between the cam disk and in each case at least one tooth. The pivoting segment makes tilting of the tooth possible relative to the surface of the cam disk or relative to the pivoting segment. Precisely one tooth, in particular precisely one flat tooth or precisely one round tooth, or two teeth or more than two teeth are typically mounted on one pivoting segment. A plurality of teeth which are mounted on one pivoting segment are typically arranged next to one another in a row in the axial direction. A flat tooth is typically oriented with its longer transverse extent in the direction of the longitudinal axis of the gear mechanism.

The teeth are typically connected in each case loosely to the respective pivoting segments. Preferred pivoting segments comprise a profile which prevents sliding of the tooth from the pivoting segment or sliding of the pivoting segment at least in one direction. It should be taken into consideration that in this way the pivoting segments are held in their position in the circumferential direction relative to the tooth carrier by way of the guided teeth. A profile of this type can be, for example, a bead which engages into a depression. The pivoting segment can have a bead or a depression.

The pivoting segments preferably have mutually facing edges with elevations and depressions, for example an undulating shape or a zigzag shape. This affords the advantage that needle rollers which are arranged below the pivoting segments are held reliably in the space between the pivoting segments and the drive element even in the case of a relatively great spacing between the pivoting segments.

Typical embodiments of the invention comprise a cam disk as drive element. The cam disk preferably has a non-circular or non-ellipsoid arcuate shape or curve. The non-circular or non-ellipsoid arcuate shape affords the advantage that different cams can be used, in order, for example, to set different transmission ratios. In the context of this application, eccentrics are likewise included under circular or ellipsoid shapes, since in the case of eccentrics it is only the rotational axis which does not correspond to the central axis of the circular shape; there is nevertheless a circular shape, however. Typical cam disks comprise at least or precisely two elevations which are typically arranged uniformly distributed over the circumference. The elevations can also be called maxima. A plurality of elevations bring more teeth into engagement with the toothing system or internal toothing system.

In typical embodiments, the tooth carrier or the toothing system is of circular configuration. This affords the advantage of simple geometry for the tooth carrier and the toothing system. The transmission of force typically takes place on the slow side of the gear mechanism between the toothing system and the tooth carrier. This affords the advantage that the path for the transmission of force is extremely short, with the result that an extremely high stiffness can be achieved. Embodiments which meet these conditions are, in a non-exhaustive list: a gear mechanism with an inner cam disk as drive and an outer internal gear with a toothing system, the tooth carrier being arranged between the internal gear and the cam disk; an outer cam disk with an inner profiling on an internal gear for driving the radially movable teeth inward against a toothing system which is arranged on a gearwheel or a rack.

The toothing system and the teeth typically have curved flanks. Examples for curvatures of the flanks are a cylindrical curvature or a curvature in the form of a logarithmic spiral. Reference is made to DE 10 2007 011 175 A1 for one possible embodiment of a curvature in the form of a logarithmic spiral. The curved surface affords the advantage that the flanks which are in engagement bear over a full area and not merely in a linear or punctiform manner. In this way, an extreme stiffness is achieved during the transmission of force between the toothing system and the teeth.

Typical embodiments comprise a tooth carrier with a first tooth carrier part and a second tooth carrier part. Assembly of a gear mechanism with integrated bearings is made possible in this way. The tooth carrier is typically split asymmetrically. Further embodiments comprise tooth carriers with a symmetrical split. Embodiments can comprise third and possibly also further tooth carrier parts. Typical tooth carriers are split in an axial plane. An axial plane is typically a plane which lies perpendicularly with respect to the rotational axis of the gear mechanism. Embodiments have an interface or joining face between the tooth carrier parts which is smooth or which is stepped or which has elevations and/or depressions, for example in order to provide a defined positional relation between the tooth carrier parts.

Typical embodiments comprise at least one integrated bearing. Integrated bearings are typically bearings which do not have a dedicated bearing ring. Typical integrated bearings use component surfaces as bearing surfaces. Space can be saved in this way. In particular, an extent of the gear mechanism in the axial or radial direction can be reduced as a result. Typical gear mechanisms can have the following advantages: a shaft nut can be dispensed with; improved smooth running can be achieved on account of a shorter tolerance chain and/or assembly complexity can be minimized.

The first tooth carrier part and the second tooth carrier part are typically connected by way of a connecting means. Typical connecting means comprise pins, rivets and bolts. In typical embodiments, there are, for example, hole circles, blind hole bores or combinations thereof in the tooth carrier parts. This makes secure and precise assembly possible. In typical embodiments, the tooth carrier parts are provided with contours, for example lugs, grooves, blind hole bores or pins, with the result that they can be joined only in exactly one angular position. Typical embodiments comprise markings, in order to ensure an assembly in a defined angular position.

In typical embodiments, the first tooth carrier part comprises at least two circumferential rows of guides, which rows are arranged in parallel in the axial direction. Typical embodiments comprise at least two circumferential rows of teeth. A plurality of rows affords more force action area and, moreover, at least two rows afford stability for the pivoting segments with respect to rotations, for example, about a radial axis. Typically, all guides are arranged in the first tooth carrier part and/or the second tooth carrier part is free from guides.

At least one bearing with rolling bodies is typically arranged between a housing of the gear mechanism and the tooth carrier, the rolling bodies lying directly on a tooth carrier bearing face of the tooth carrier and/or a housing bearing face of the housing. The tooth carrier bearing face is typically configured in one piece with the tooth carrier or the housing. Direct mounting is also understood to mean integrated mounting. It affords the effect of a small amount of installation space. Typical rolling bodies comprise rollers, balls and cones. In typical embodiments, a roller bearing which is, in particular, adjusted and is configured, for example, as an angular contact roller bearing or a tapered roller bearing is used. The rolling bodies are typically arranged in a cage or have spacer elements. Further embodiments comprise freely circulating rolling bodies.

The tooth carrier bearing face and/or the housing bearing face and/or a rotational axis of the rolling bodies typically assumes an angle of at least 10°, at least 35° or at least 45° and/or at most 60°, at most 80° or at most 75° with respect to the longitudinal axis of the gear mechanism. Angles of approximately 45° or of between 40° and 50° are particularly suitable for axial, radial and tilting moment loads. Embodiments with from 55° to 65° or approximately 60° are suitable for predominant axial loads and tilting moment loads.

Typical gear mechanisms of embodiments comprise a toothing system which is configured integrally with the housing. This can result in installation space advantages. In further embodiments, a toothing system, for example an internal gear, is arranged in the housing.

Typical embodiments comprise a bearing with pivoting segments and segment bearing bodies between the cam face and the teeth. At least two axially parallel teeth are typically provided per pivoting segment. In this way, the pivoting segment can be stabilized in its raceway. Typical embodiments comprise one or at least two segment bearing body rows which are arranged axially next to one another per circumferential row of pivoting segments. A pivoting segment can be mounted on at least two segment bearing body rows which are parallel circumferentially. Here, in the case of two or more rows of teeth which are arranged in parallel, in each case one segment bearing body row can be arranged below a tooth row, with the result that the pivoting segment experiences support below in each case one tooth row.

Typical tooth carriers of embodiments comprise at least one radially inwardly or radially outwardly extending run-on flange which engages over the pivoting segments at least partially in the radial direction. In this way, there is the option to dispense with additional run-on disks. The run-on flange can be configured integrally with the tooth carrier or can be fastened to the tooth carrier. Typical embodiments do not have a run-on disk. Some embodiments comprise a run-on disk at least on one side axially next to the segment bearing bodies in order to guide the pivoting segments. Typical segment bearing bodies are configured as needle rollers or balls.

In the case of embodiments with a run-on flange on the tooth carrier, at least one of the run-on flanges typically comprises an output bearing face which interacts directly with output bearing rolling bodies. In further embodiments, in particular embodiments with a separate run-on disk for the pivoting segments, the tooth carrier typically comprises at least one flange which comprises an output bearing face. A flange of this type can be constructed in an analogous manner with respect to a run-on flange, but does not have the same function, for example since there is a separate run-on disk. A bearing is typically configured integrally between the tooth carrier and the cam disk or a shaft which is connected to the cam disk. Embodiments of this type can be space-saving. The output bearing rolling bodies are typically mounted directly on the cam disk. In further embodiments, a bearing with bearing rings is provided between the tooth carrier and the cam disk. This can simplify the production. The output bearing rolling bodies are typically configured as needle rollers or balls.

Typical gear mechanisms comprise a plurality of pivoting segments which are arranged circumferentially on segment bearing bodies and lie in each case with an anti-friction bearing face on the segment bearing bodies. The segment bearing bodies are typically mounted on the cam disk. The segment bearing bodies reduce the frictional resistance. Further embodiments comprise a plain bearing between the pivoting segments and the cam disk.

In each case one rim bearing face is typically arranged on both sides in the axial direction on the pivoting segments, the two rim bearing faces of a pivoting segment lying at least partially on rims of the cam disk. In this way, tilting of the pivoting segments can be prevented and smooth running can be ensured.

Typical production methods of the invention comprise connecting the first tooth carrier part and the second tooth carrier part by means of connecting means. Typically, the tooth carrier parts are machined in one clamping. Typical machining operations which are carried out in one clamping are, for example, the production of tooth carrier bearing faces on the tooth carrier, in particular for integrated bearings, or the production of the guides for the teeth. Hardening of the tooth carrier bearing faces, drilling, reaming and/or honing and/or smoothing of the guides, turning of the tooth carrier bearing faces and/or grinding of the tooth carrier bearing faces can be part of this. During the machining in one clamping, the tooth carrier parts can be connected by way of the connecting means or can be fixed relative to one another additionally or exclusively in some other way, for example by way of clips. In embodiments, the first tooth carrier part and/or the second tooth carrier part can be machined only partially, for example on the tooth carrier bearing faces.

The toothing system and the housing bearing faces are typically machined in one clamping, in particular in the case of toothing systems which are configured integrally with the housing, but typically also in the case of a toothing system which is fastened to the housing. High precision is achieved in this way. Here, the following machining operations are typically carried out in one clamping: hardening, eroding, hob peeling, reaming, honing, grinding and/or smoothing of the toothing system and/or turning, smoothing and/or grinding of the bearing running faces. In typical methods for production, dimensions of parts which have already been manufactured, such as tooth carrier parts or the toothing system or the cam disk, can be taken, in order to achieve a compensation by way of corresponding manufacture of the remaining parts.

Within the context of an integral mounting of embodiments, remaining dimensional tolerances with regard to the bearing raceways can be compensated for by way of the selection of components. No selection is performed in further embodiments.

Advantages of typical embodiments are, inter alia, a low space requirement, low costs, low assembly complexity and/or an improvement in smooth running.

BRIEF DESCRIPTION OF THE DRAWING

In the following text, the invention will be explained in greater detail using the appended drawing, in which:

FIG. 1 diagrammatically shows a first embodiment of the invention in a detail of a longitudinal section through a gear mechanism.

DESCRIPTION OF EXEMPLARY EMBODIMENTS

In the following text, typical embodiments of the invention will be described using the figures, the invention not being restricted to the exemplary embodiments, but rather the scope of the invention being determined by the claims. During the description of the embodiment, identical reference numerals are used in some circumstances for identical or similar parts in different figures and for different embodiments, in order to make the description clearer. This does not mean, however, that corresponding parts of the invention are restricted to the variants which are shown in the embodiments.

FIG. 1 shows a typical embodiment of a gear mechanism 1 according to the invention in a detail of a sectional view. Reference is made, for example, to DE 10 2007 011 175 A1 for further explanations in respect of the method of operation of the gear mechanism and for further technical features.

The gear mechanism 1 comprises a cam disk 3 which is configured integrally with the drive shaft and, as a result, has a design which is elongate in the axial direction. The cam disk 3 comprises two profilings which can also be called raceways or pivoting bearing raceways. Said profilings 5 and 7 have a radius which changes over the circumference; in particular, they have in each case two maxima which can also be called elevations and two minima, the two profilings 5 and 7 having the same angular position of the changing radii.

Further embodiments have merely one raceway or one profiling. In alternative embodiments, three or more profilings or raceways can also be provided for segment bearing bodies.

Segment bearing bodies 15 and 17 are mounted on the profilings 5 and 7. Pivoting segments 19 are mounted on said segment bearing bodies 15 and 17, merely one pivoting segment 19 being shown in the sectional view of FIG. 1. The pivoting segment 19 therefore lies on two rows of circumferential segment bearing bodies 15 and 17.

The pivoting segment 19 comprises a bead on the radial outer side of the pivoting segment 19, which bead engages into grooves of two teeth 25 and 27. The teeth 25 and 27 are mounted in their axial position with regard to the longitudinal axis 30 of the gear mechanism 1 at least substantially centrally via the segment bearing bodies 15 and 17, in each case one tooth 25 or 27 being mounted via one segment bearing body 15 or 17. In this way, a continuous transmission of force through the pivoting segment 19 is achieved. Moreover, the segment bearing bodies 15 and 17 which are configured as needle rollers are loaded approximately centrally. Furthermore, the overall length of the segment bearing bodies 15 and 17 themselves can be reduced by way of said measure, it being possible for the running stability to be increased.

The cam disk 3 has rims 32, 34 and 36 for delimiting the profilings 5 and 7. The rim 34 lies centrally between the segment bearing bodies 15 and 17, whereas the two rims 32 and 36 restrict the freedom of movement of the segment bearing bodies 15 and 17 in each case in the axial direction toward the outside. The pivoting segment 19 has rim bearing faces 33 and 37 which can be supported in each case on the rims 32 and 36. In this way, the smooth running of the pivoting segment 19 is increased.

The teeth 25 and 27 engage into a common toothing system 40 which is configured integrally with a housing 42 of the gear mechanism 1.

The teeth 25 and 27 are received in radially oriented guides in a second tooth carrier part 44 of a tooth carrier. Moreover, the tooth carrier also comprises a first tooth carrier part 45 which is connected to the second tooth carrier part 44 by way of a connecting means 48 which is configured as a screw. A plurality of connecting means 48 (a total of six in the exemplary embodiment of FIG. 1) are provided over the circumference of the tooth carrier.

In further embodiments, a different number of connecting means can also be provided, an odd number also being possible. The connecting means can be distributed uniformly over the circumference of the tooth carrier, and it is also possible in contrast to provide different angular intervals, for example in order to make it possible to join the two tooth carrier parts together only in a defined angular position. Thus, in the embodiment of FIG. 1, the angles between the connecting means are not uniform by way of example, in order to permit a reassembly of the tooth carrier parts of the tooth carrier only in a defined relative angular position with respect to one another. In further embodiments, grooves, pins or other contours can be provided, or markings can be provided, in order to permit or make possible reassembly only in a defined angular position. In this way, machining of the tooth carrier in one clamping is possible, the tooth carrier parts subsequently being released again from one another, in order then to be connected to one another again in the gear mechanism.

Rolling bodies 50 which are mounted at an angle of 60° with respect to the longitudinal axis 30 of the gear mechanism 1 are provided for mounting the tooth carrier on the housing 42. Here, the angular positions of the rolling bodies 50 are mirror-symmetrical with respect to an axial sectional plane of the gear mechanism 1 with respect to one another, in order to achieve reliable mounting of the tooth carrier in the housing 42. In further embodiments, greater or smaller angles than 60° are also used, depending on whether and in what magnitude axial forces are to be absorbed.

The rolling bodies 50 are mounted in each case directly on tooth carrier bearing faces 54 and 55 of the first tooth carrier part 44 and the second tooth carrier part 45. On the housing side, the rolling bodies 50 are mounted on housing bearing faces 58 of the housing 42. The rolling bodies 50 therefore roll in each case directly on the tooth carrier bearing faces 54 and 55 and on the housing bearing faces 58. In this way, compact integral mounting is achieved which takes up a small amount of installation space.

Furthermore, in the exemplary embodiment of FIG. 1, the output bearing is also configured as an integral bearing, the tooth carrier or, in the case of the embodiment of FIG. 1, the second tooth carrier part 44 having an output bearing face 60, on which output bearing rolling bodies 62 which are configured as rollers roll directly. A further output bearing face 64 which likewise interacts directly with the output bearing rolling bodies 62 is configured on the cam disk. As a result, the output bearing rolling bodies roll directly on the cam disk 3. In this way, an integrated bearing is provided for a compact overall design.

The output bearing face 60 of the second tooth carrier part 44 is part of an output-side run-on flange 66 which prevents yielding of the pivoting segments 19 in the output-side direction. A compact overall design and high stiffness are achieved by way of the integral configuration of the run-on flange 66 with the second tooth carrier part 44.

The first tooth carrier part 45 has a further run-on flange 68 which likewise prevents yielding of the pivoting segments 19 in the opposite direction.

A further bearing for the cam disk 3 which is configured integrally with a drive shaft is typically provided so as to lie opposite the output, that is to say so as to lie opposite the side of the output bearing. However, this lies outside the illustrated region of FIG. 1. On the drive side, there is also in some circumstances a larger installation space in the radial direction, with the result that the drive-side bearing can be optionally configured as a bearing with separate running faces. In further embodiments, the drive bearing can also be configured as an integral bearing.

The invention claimed is:

1. Gear mechanism comprising a coaxial gear mechanism or a linear gear mechanism, having
a toothing system,
a tooth carrier with radially oriented guides,
teeth which are received in the guides for engagement with the toothing system, the teeth being mounted in the guides such that they can be displaced radially relative to the tooth carrier in the direction of their longitudinal axis,
a cam disk for radially driving the teeth,
the tooth carrier comprising a first tooth carrier part and a second tooth carrier part, and
at least one bearing with rolling bodies being arranged between a housing of the gear mechanism and the tooth carrier, the rolling bodies lying directly on a tooth carrier bearing face of the tooth carrier.

2. Gear mechanism according to claim 1, the first tooth carrier part and the second tooth carrier part being connected by way of a connecting means.

3. Gear mechanism according to claim 1, the second tooth carrier part comprising at least two circumferential rows of guides, which rows are arranged in parallel in the axial direction.

4. Gear mechanism according to claim 1, wherein the rolling bodies lie directly on a housing bearing face of the housing.

5. Gear mechanism according to claim 4, the toothing system being configured integrally with the housing.

6. Gear mechanism according to claim 4, at least one part of the group of parts consisting of the tooth carrier bearing face and the housing bearing face, and a rotational axis of the rolling bodies assuming an angle of at least 10° or at most 80° with respect to the longitudinal axis of the gear mechanism.

7. Gear mechanism according to claim 1, further comprising a bearing with pivoting segments and segment bearing bodies between the cam face and the teeth.

8. Gear mechanism according to claim 7, the tooth carrier comprising at least one radially inwardly or outwardly extending run-on flange which engages over the pivoting segments at least partially in the radial direction.

9. Gear mechanism according to claim 1, wherein at least one of the tooth carrier parts comprises a run-on flange having an output bearing face which interacts directly with output bearing rolling bodies.

10. Gear mechanism according to claim 9, the output bearing rolling bodies being mounted directly on the cam disk.

11. Gear mechanism according to claim 1, further comprising a plurality of pivoting segments which are arranged circumferentially on segment bearing bodies, wherein each of the plurality of pivoting segments has an anti-friction bearing face lying on the segment bearing bodies, and wherein each of the plurality of pivoting segments has a rim bearing face arranged on both sides of the pivoting segments in the axial direction.

12. A method for producing the gear mechanism of claim 1, comprising connecting the first tooth carrier part and the second tooth carrier part by means of connecting means; and machining the toothing system and the housing bearing faces in one clamping.

13. The method according to claim 12, further comprising machining of the first tooth carrier part and the second tooth carrier part in one clamping.

* * * * *